US012563174B2

(12) United States Patent
Huber

(10) Patent No.: US 12,563,174 B2
(45) Date of Patent: Feb. 24, 2026

(54) 3D LIGHT EMITTER WITH CLOSELY SPACED PACKAGES

(71) Applicant: Liminal Space, Inc., Los Angeles, CA (US)

(72) Inventor: Nathaniel Huber, Hollywood, CA (US)

(73) Assignee: Liminal Space, Inc., Los Angeles, CA (US)

( * ) Notice: Subject to any disclaimer, the term of this patent is extended or adjusted under 35 U.S.C. 154(b) by 9 days.

(21) Appl. No.: 18/590,690

(22) Filed: Mar. 14, 2024

(65) Prior Publication Data

US 2025/0294133 A1 Sep. 18, 2025

(51) Int. Cl.
*H04N 13/337* (2018.01)
*G02B 5/30* (2006.01)
(52) U.S. Cl.
CPC ......... *H04N 13/337* (2018.05); *G02B 5/3058* (2013.01)
(58) Field of Classification Search
CPC ............................. H04N 13/337; G02B 5/3058
See application file for complete search history.

(56) References Cited

U.S. PATENT DOCUMENTS

| 7,864,268 B2 * | 1/2011 | Egi | G02F 1/133533 |
| | | | 349/194 |
| 11,326,763 B1 * | 5/2022 | Molner | F21V 9/14 |

| 11,543,676 B2 | 1/2023 | Huber | |
| 2002/0160296 A1 * | 10/2002 | Wolk | H10K 71/18 |
| | | | 156/235 |
| 2004/0233275 A1 * | 11/2004 | Tomita | G02B 30/25 |
| | | | 348/42 |
| 2009/0296190 A1 * | 12/2009 | Anderson | B60R 1/088 |
| | | | 156/60 |
| 2010/0231700 A1 * | 9/2010 | Jalbout | H04N 13/337 |
| | | | 348/58 |
| 2010/0309395 A1 * | 12/2010 | Murata | G02B 7/006 |
| | | | 348/836 |
| 2013/0038838 A1 * | 2/2013 | Ferri | H04N 9/3164 |
| | | | 353/20 |
| 2018/0059429 A1 * | 3/2018 | Huber | H10H 29/10 |
| 2018/0203245 A1 * | 7/2018 | Chen | G02B 30/25 |
| 2019/0331839 A1 * | 10/2019 | Li | C25D 21/12 |
| 2020/0117046 A1 * | 4/2020 | Hwang | G02F 1/133504 |
| 2023/0271804 A1 * | 8/2023 | Abe | B31F 1/36 |
| | | | 270/1.01 |

* cited by examiner

*Primary Examiner* — Timothy R Newlin
(74) *Attorney, Agent, or Firm* — Fish IP Law, LLP

(57) ABSTRACT

A stereoscopic display module includes an array of multiple light emitting packages, each of which is topped by a polarizer. Package-polarizer sets are closely spaced, such that at 10% of oblique light from a middle package-polarizer set is blocked by adjacent package-polarizer sets. In preferred embodiments 0.3h≤d≤0.7h, where h is the distance between the bottom of the polarizers and the bottom of the light emitters, and d, the distance between edges of adjacent light-emitting packages. Glass-On-Board (GOB) packages and Chip-On-Board (COB) packages are contemplated, with any suitable combination of color light emitters. Modules preferably include arrays of at least 9, 16, 32, 64, and 128 package-polarizer sets.

23 Claims, 4 Drawing Sheets

3D LIGHT EMITTER WITH CLOSELY SPACED PACKAGES

FIELD OF THE INVENTION

The present invention generally relates to three-dimensional (3D) stereoscopic display modules and systems.

BACKGROUND

In a physical world viewing experience, each eye provides a slightly different image to the brain. Stereoscopic display systems attempt to recreate that visual experience using polarizers that present different views to each eye of a viewer.

Earlier attempts to recreate a real world visual 3D experience employed an apparatus similar to corrective eyewear, comprising lenses of different colors. A monitor or projector projected two views on one screen, with each view being color coded so as to be complementary to one eyewear lens or the other. The use of color to segregate viewing channels would often lead to headaches for the viewers.

Recent 3D designs focus on creating a 3D viewing experience within a traditional movie theater environment, using devices centering around a display on a lenticular screen constructed of fabric. However, limited stereoscopic viewing advancements have occurred outside the movie theater environment, including on billboards and other public media/advertising delivery devices. In general, it would be desirable to provide a 3D viewing experience using a wider range of devices, billboards, LED movie theater screens, stadium jumbotrons, and/or other large display devices.

Currently pending U.S. Ser. No. 18/379,628 to Liminal-Space, teaches solutions in which spaces between light emitter package-polarizer sets are filled with a high opacity material, at least up to the bottom of the polarizers. That arrangement is successful in precluding significant oblique light from by-passing the polarizers. As demand continues for modules with higher density package-polarizer sets, however, issues arise with respect to including sufficient amount of high opacity material between adjacent package-polarizer sets.

The '828 application is incorporated herein by reference. Where a definition or use of a term in the '828 incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems, and methods in which a display module includes multiple closely spaced packages, each of which is topped by a polarizer. Surprisingly, despite the close spacing, oblique light from adjacent package-polarizer sets does not overly reduce the quality of perceived 3D images. As used herein, oblique light with respect to package-polarizer sets means light emanated from a light emitter of a package-polarizer set traveling in a direction other than through the polarizer of the package-polarizer set.

In some contemplated embodiments at least 10% (the blocked percentage) of oblique light of a middle package-polarizer set is blocked by adjacent package-polarizer sets. More preferably at least 20% of such oblique light is blocked, and most preferably at least 30% is blocked.

Viewed from another perspective, closeness is defined with respect to a ratio between height (h), taken as the distance between the bottom of the polarizers and the bottom of the light emitters, and d, the distance between edges of adjacent light-emitting packages. In some contemplated embodiments $0.3h \leq d \leq 0.7h$, in other contemplated preferred embodiments $0.4h \leq d \leq 0.6h$, and in still other contemplated embodiments $d \approx 0.4h$. In experiments with modules in which 1 mm×1 mm Glass-On-Board (GOB) packages and Chip-On-Board (COB) where h=0.5 mm, good quality of perceived 3D images is obtained where $d \approx 0.2$ mm.

Although successful experiments have been performed with GOB and COB packages that do not have opaque side walls, close spacing packages of other packages are also contemplated, including where the packages have opaque side walls.

Packages can have any suitable number and type of light emitters, including LEDs of different visible colors. Preferred packages have different LEDs for red, green, and blue, and sometimes a fourth color, cyan. However, it is also contemplated to include one or more LEDs that selectively emit different colors or combinations of colors.

Also in preferred embodiments, polarizers atop adjacent packages polarize light in different directions, for example right and left linearly, and right and left circularly.

Various resources, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The recitation of ranges of values herein is merely intended to serve as a shorthand method of referring individually to each separate value falling within the range. Unless otherwise indicated herein, each individual value is incorporated into the specification as if it were individually recited herein, and ranges include their endpoints. Numerical parameters should be construed in light of the number of reported significant digits and by applying ordinary rounding techniques.

The meaning of "a," "an," and "the" includes plural reference unless the context clearly dictates otherwise. Also, as used in the description herein, the meaning of "in" includes "in", "within" and "on" unless the context clearly dictates otherwise.

The present designs are useful in overcoming issues with previous designs, by providing modules that include multiple light emitting packages spaced sufficiently close together, such that adjacent packages preclude significant oblique light from by-passing each other's polarizers.

It is to be understood that any type of encapsulated LED packages can be employed in the current designs. Contemplated packages of FIGS. 1-8 include at least Glass-On-Board (GOB) and Chip-On-Board (COB) types of packages. Contemplated light emitters include RGBY, RGBW (white), RGBC (cyan), RGB plus infrared, digital RGB, surface-mounted device LED package (SMDs), and quantum dot LEDs. Preferred light emitters have a light emitting surface area of less than 0.05 mm.

Figure 1:
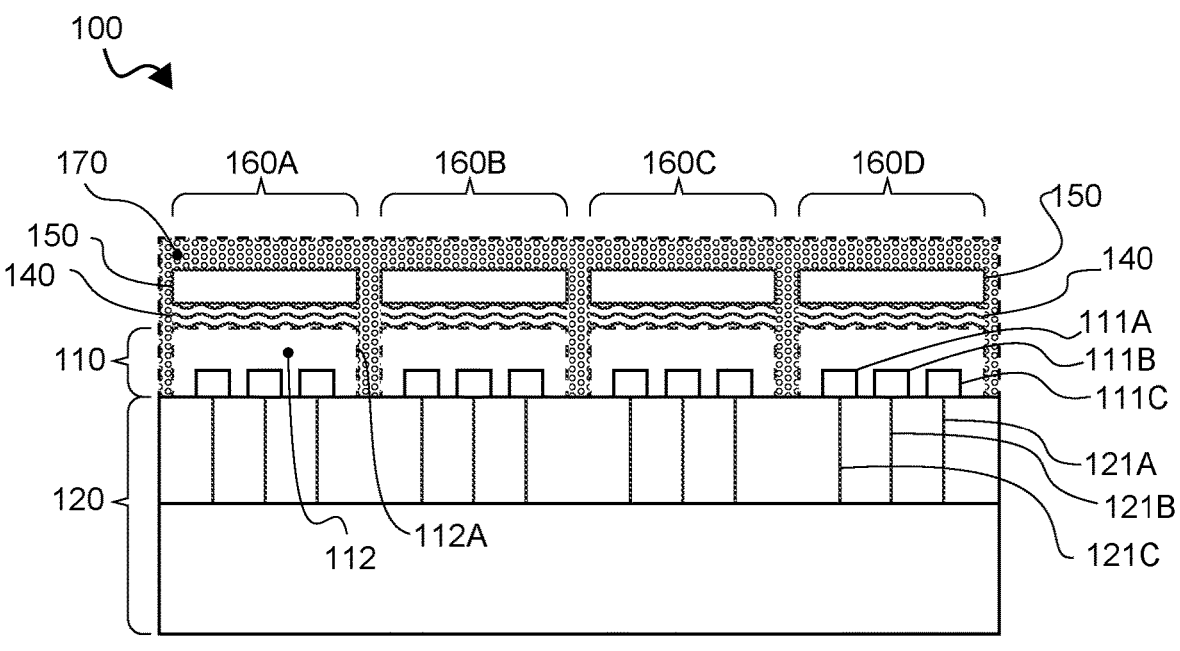
FIG. 1 is a vertical cross-section of a stereoscopic 3D light emitting module, having four closely spaced packages mounted on a substrate, with each package having transparent side walls and three emitting color diodes. A polarizer is positioned above each package, and all packages are encapsulated in resin or other encapsulating material.

FIG. 1 is a vertical cross-section of a stereoscopic 3D light emitting module 100, having four closely spaced packages 110 mounted on a substrate 120. Each of the packages 110 has light emitting color diodes 111A, 111B, 111C, and filler 112 that extends to transparent edges 112A designated by dashed lines. Above and about each of the packages 110 is an adhesive 140 and a polarizer 150. There are thus four package-polarizer sets 160.

Above and to the sides of each set of package-polarizer sets 160A, 160B, 160C, 160D and 160B is an encapsulate material 170. Package-polarizer sets 160A and 160C polarize light in an opposite direction to package-polarizer sets 160B and 160D. Below each of the packages 110, are power and data lines 121A, 121B, 121C providing electrical couplings to the light emitting color diodes 111A, 111B, 111C. The power and data lines 121A, 121B, 121C are positioned on top of, and/or pass through substrate 120 to power diodes 111A, 111B, 111C, respectively.

Figure 2:
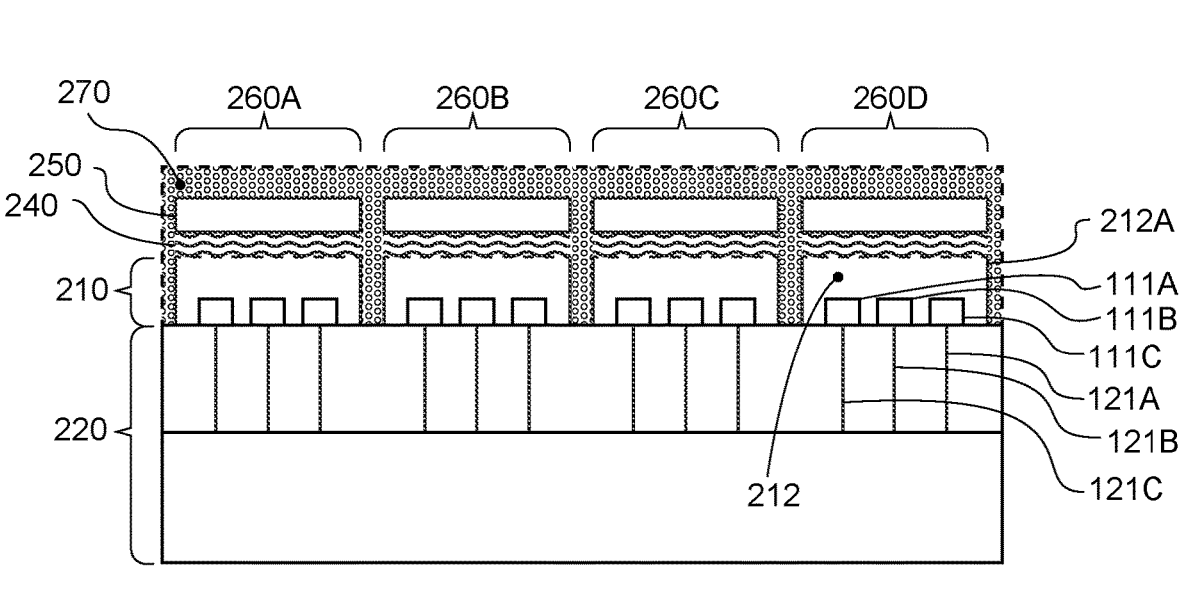
FIG. 2 is a vertical cross-section of a stereoscopic 3D light emitting module, having four closely spaced packages mounted on a substrate, with each package having opaque side walls and three emitting color diodes. A polarizer is positioned above each package, and all packages are encapsulated in resin or other encapsulating material.

FIG. 2 is a vertical cross-section of a stereoscopic 3D light emitting module 200, having four closely spaced packages 210 mounted on a substrate 220. Each of the packages 210 has light emitting color diodes 211A, 211B, 211C, and filler 212 that extends to opaque edges or walls 212A designated by solid lines. Above each of the packages 210 is an adhesive 240 and a polarizer 250. There are thus four package-polarizer sets, two sets of 260A, and two sets of 260B that polarize light in a different orientation from 260A.

Above and to the sides of each set of package-polarizer sets 260A, 260B is an encapsulate material 270. Below each of the packages 210, are power and data lines 221A, 221B, 221C providing electrical couplings to the light emitting color diodes 211A, 211B, 211C. The power and data lines 221A, 221B, 221C are positioned on top of, and/or pass through substrate 220 to power diodes 211A, 211B, 211C, respectively.

Accordingly, the embodiment of FIG. 2 is similar to the embodiment of FIG. 1 except that filler 212 extends to opaque edges or walls 212A instead of the transparent edges 112A of FIG. 1.

Figure 3:
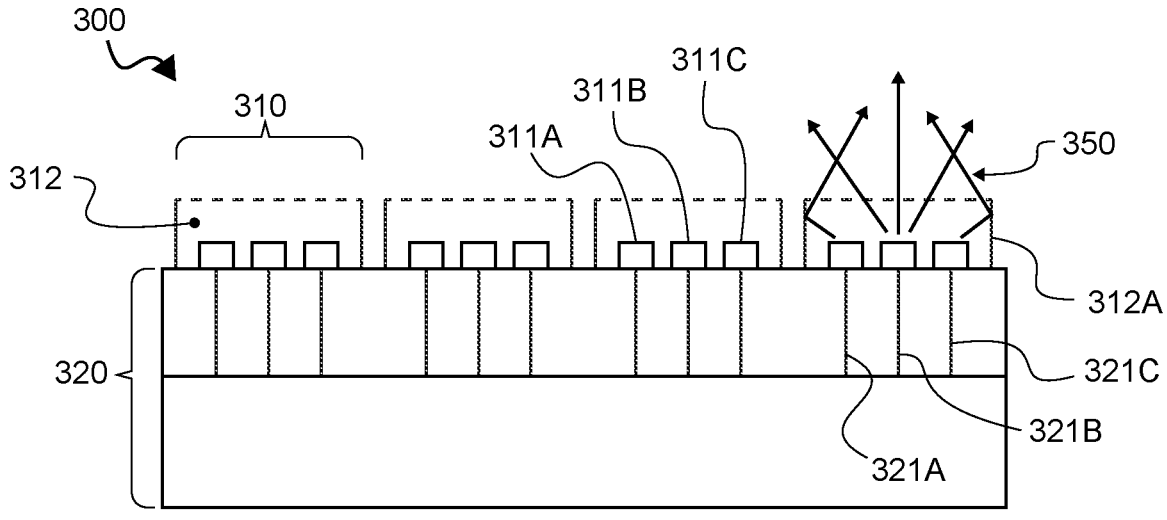
FIG. 3 is a vertical cross-section of a prior art stereoscopic 3D light emitting module, having four closely spaced packages mounted on a substrate, with each package having opaque side walls and three emitting color diodes. Polarizers are yet to be mounted, which would transform the 2D LED module into a stereoscopic 3D light emitting module.

FIG. 3 is a vertical cross-section of a prior art stereoscopic 2D light emitting module 300, similar to module 200 of FIG. 2, but without adhesive, polarizers, and encapsulating material. Module 300 has four closely spaced packages 310 mounted on a substrate 320. Each of the packages 310 has light emitting color diodes 311A, 311B, 311C, and filler 312 that extends to opaque edges or walls 312A designated by solid lines. Below each of the packages 310, are power and data lines 321A, 321B, 321C providing electrical couplings to the light emitting color diodes 311A, 311B, 311C. The power and data lines 321A, 321B, 321C are positioned on top of, and/or pass through substrate 320 to power diodes 311A, 311B, 311C, respectively.

The ray lines 350 illustrate that significant oblique light is reflected or blocked by the opaque side walls 312A.

Figure 4:
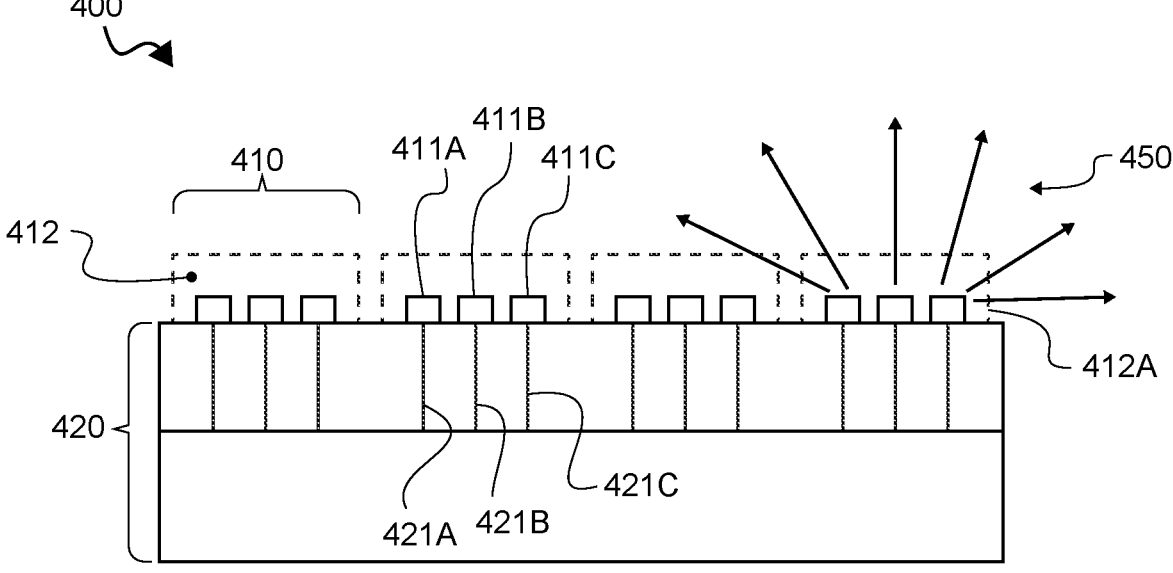
FIG. 4 is a vertical cross-section of a prior art 2D light emitting module, having four closely spaced packages mounted on a substrate, with each package having transparent side walls, three emitting color diodes. Polarizers are yet to be mounted, which would transform the 2D LED module into a stereoscopic 3D light emitting module.

FIG. 4 is a vertical cross-section of a prior art 2D light emitting module 400, similar to module 100 of FIG. 1, but without adhesive, polarizers, and encapsulating material. Module 400 has four closely spaced packages 410 mounted on a substrate 420. Each of the packages 410 has light emitting color diodes 411A, 411B, 411C, and filler 412 that extends to transparent edges 412A designated by the dashed lines. Below each of the packages 410, are power and data lines 421A, 421B, 421C providing electrical couplings to the light emitting color diodes 411A, 411B, and 411C, respectively. The power and data lines 421A, 421B, 421C are positioned on top of, and/or pass through the substrate 420.

The ray lines 450 illustrate that without the polarizers, oblique light emitted from LED packages is not significantly blocked by transparent edges 412A of filler 412.

Figure 5:
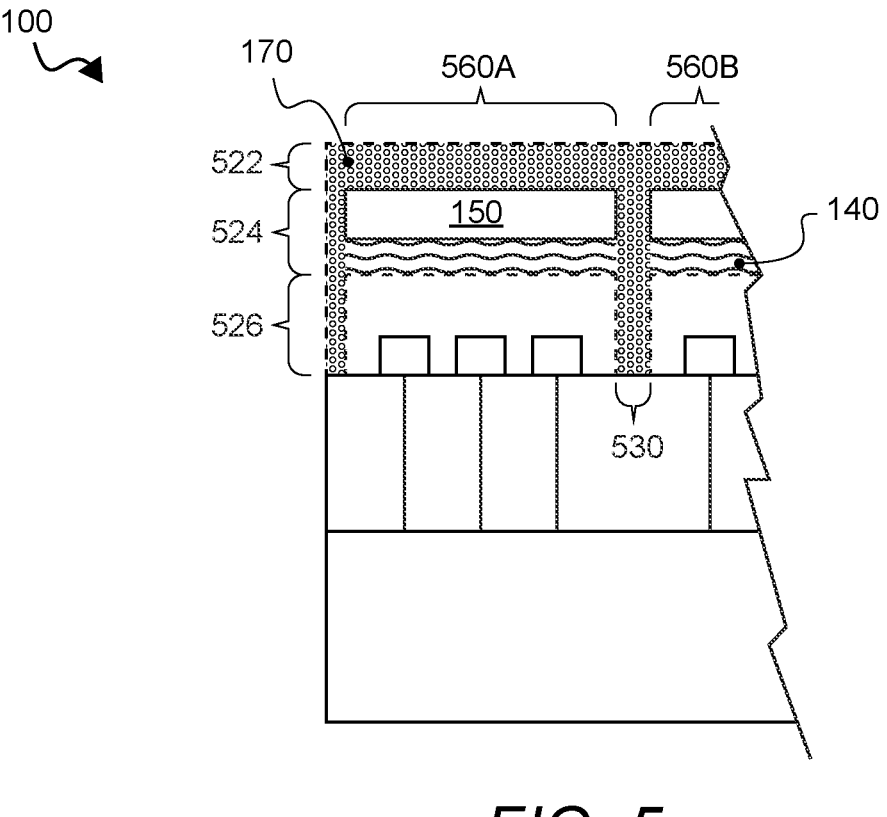
FIG. 5 is a vertical cross-section of a portion of the stereoscopic 3D light emitting module of FIG. 1, identifying dimensions in a preferred embodiment.

FIG. 5 is a vertical cross-section of a portion of the stereoscopic 3D light emitting module 100 of FIG. 1, here only showing one complete and one partial package-polarizer set 560a and cut-way of a adjacent package-polarizer set 560B. In this specific example, not drawn to scale, each of the package-polarizer sets 560A, 560B is substantially square horizontally, with a side to side width of 1 mm. Approximate thickness 522 of the encapsulate material 170 above the polarizers 150 is 0.1 mm, combined approximate thickness 524 of the polarizers 150 and adhesive 140 is 0.35 mm, and approximate thickness 526 of the packages 110 is 0.5 mm. Approximate distance 530 between the package-polarizer sets 560A, 560B is 0.2 mm.

To simplify prosecution, closeness is defined with respect to a ratio between height (h), taken as the distance between the bottom of the polarizers and the bottom of the light emitters, and d, the distance between edges of light-emitting packages. In preferred embodiments $0.3h \le d \le 0.7h$, in more preferred embodiments $0.4h \le d \le 0.6h$, and in most preferred embodiments $d=0.4h$. In experiments with modules in which 1 mm×1 mm Glass-On-Board (GOB) packages and Chip-On-Board (COB) where h=0.5 mm, good quality of perceived 3D images is obtained where d=0.2.

Figure 6:
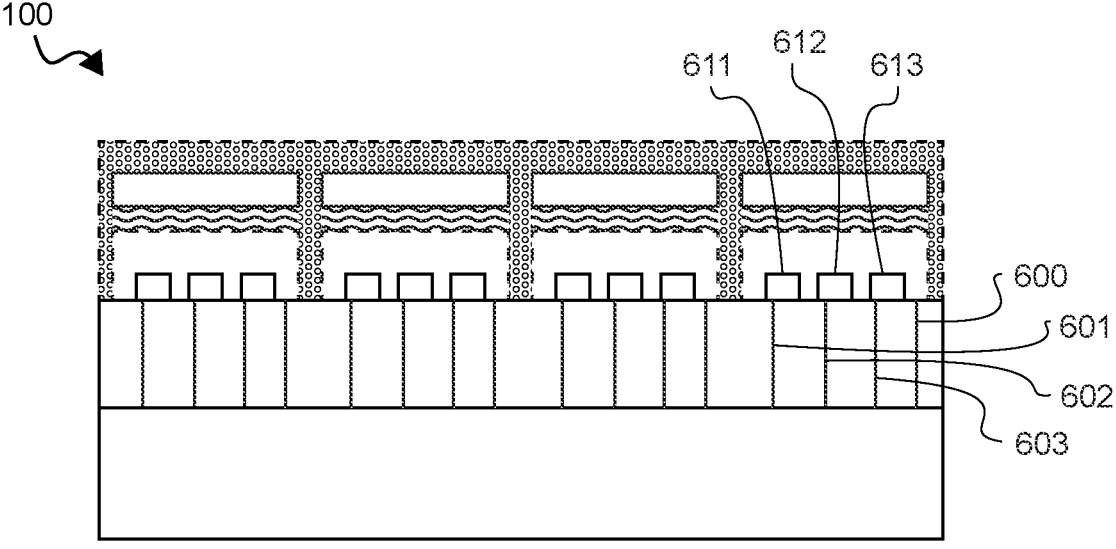
FIG. 6 is a vertical cross-section of the stereoscopic 3D light emitting module of FIG. 2, identifying power and signal lines.

FIG. 6 is a vertical cross-section of the stereoscopic 3D light emitting module of FIG. 1, identifying power and signal lines. Here a common anode or cathode line 600 couples with opposite polarity lines 601, 602, 603 to power red 611, green 612, and blue 613 diodes, respectively.

Figure 7:
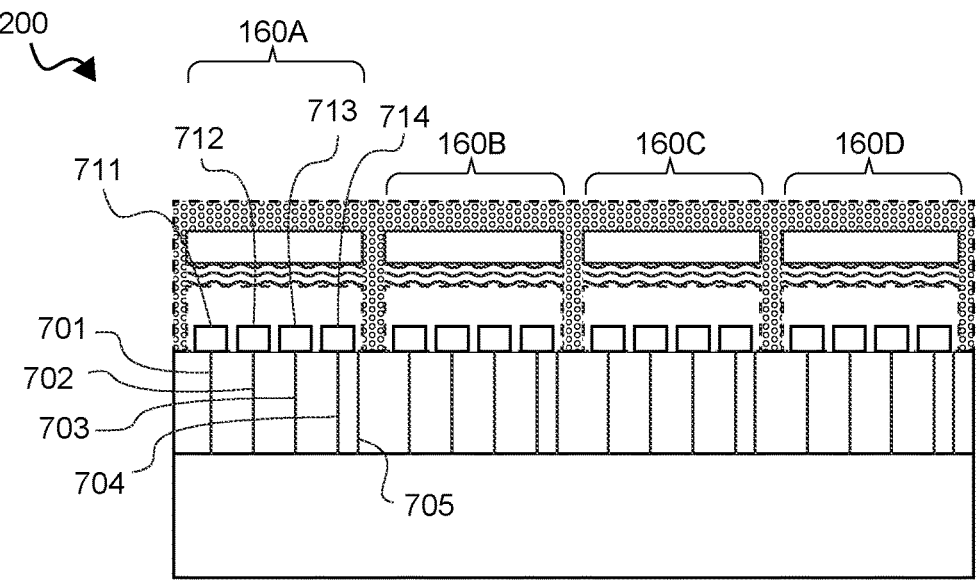
FIG. 7 is a vertical cross-section of a portion of a stereoscopic 3D light emitting module similar to the module of FIG. 1, but with four color diodes.

FIG. 7 is a vertical cross-section of a portion of a stereoscopic 3D light emitting module similar to the module of FIG. 1, but with four color diodes. Here a common anode or cathode line 705 couples with opposite polarity lines 701, 702, 703, 704 to power red 711, green 712, blue 713 and cyan 714 diodes, respectively.

Figure 8:
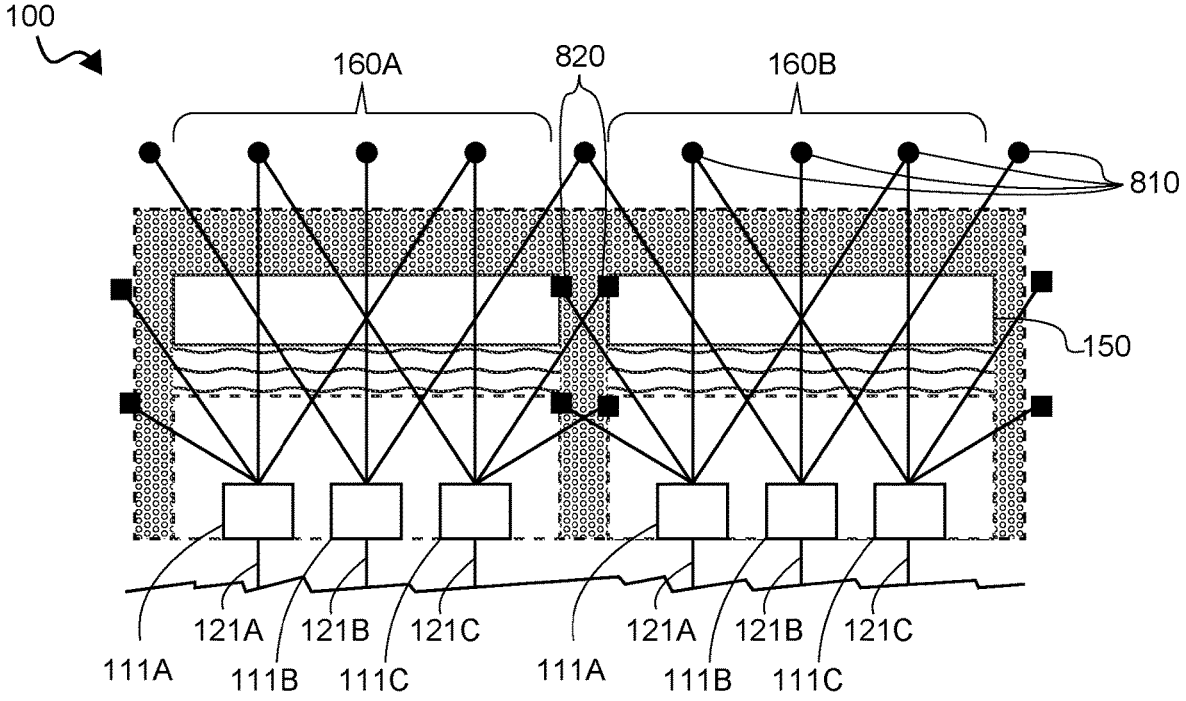
FIG. 8 is a vertical cross-section of the stereoscopic 3D light emitting module of FIG. 1, showing ray lines emanating from the light emitting diodes.

FIG. 8 is a cut-away vertical cross-section of the stereoscopic 3D light emitting module of FIG. 1, showing ray lines emanating from the light emitting diodes. The black circles 810 indicate paths of light emitted from the diodes 111A, 111B, 111C that passes through the polarizer 150 of the same package-polarizer set 160. The black squares indicate paths of light emitted from the diodes 111A, 111B, 111C that surprisingly, are substantially blocked by a closely-spaced adjacent polarizer set.

In each of the figures, the filler (e.g., filler 112, 212) and encapsulate material (e.g., encapsulate material 170, 270) may be the same or different, and are solid support compositions preferably including one or more transparent, heat-resistant, and yellowing-resistant resins.

As used here the term "transparent" means loss of intensity over the visible spectrum of less than 10% over a distance of 0.1 mm. As used herein, the term "opaque" with respect to a material means that that the material has a loss of intensity over the visible spectrum of greater than 70% over a distance of 0.1 mm. As used herein, the term "highly opaque" with respect to a material means that that the material has a loss of intensity over the visible spectrum of greater than 90% over a distance of 0.1 mm. As used herein, the term "low opacity" with respect to a material means that that the material has a loss of intensity over the visible spectrum of less than 10% over a distance of 0.1 mm.

Contemplated display modules include at least 9 package-polarizer sets, preferably in at least a 3×3 matrix. More preferably, display modules would include arrays with at least 16, 32, 64, 128 or more package-polarizer sets. Adjacent modules are preferably be spaced such that distances between package polarizer sets of adjacent modules would have the same spacing as those between package-polarizer sets within the same module.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something designated from the group consisting of A, B, C . . . and N, the text should be interpreted as requiring only one element from the group, not A plus N, or B plus N, etc.

6

The invention claimed is:

1. A stereoscopic display module, comprising:
a substrate;
at least first, second, and third light emitting packages physically coupled to the substrate, wherein the second package is situated between the first and third packages; and
each of the first, second, and third packages includes one or more light emitter(s) collectively configured to emit at least three different visible colors of light;
wherein first, second, and third polarizers are disposed above light emitters of the first, second and third packages to form first, second, and third, package-polarizer sets, respectively; and
wherein the first, second and third package-polarizer sets are sufficiently closely spaced that the first and third package-polarizer sets block at least 10% (the blocked percentage) of visible light collectively emitted by the light emitter(s) in the second package, which would otherwise pass out of the display module without passing through the second polarizer.

2. The display module of claim 1, wherein each of the first and third polarizers polarize light in a different orientation from the second polarizer.

3. The display module of claim 1, wherein in each of the first, second, and third packages, the one or more light emitter(s) includes three physically distinct light emitting semiconductors.

4. The display module of claim 3, further comprising, in each of the first, second, and third packages, a distinct power line to each of the three physically distinct light emitting semiconductors.

5. The display module of claim 1, wherein in each of the first, second, and third packages, the one or more light emitter(s) includes four physically distinct light emitting semiconductors.

6. The display module of claim 1, further comprising a resin coating above the first, second and third package-polarizer sets.

7. The display module of claim 1, wherein in each of the first, second, and third packages, the one or more light emitter(s) includes three concurrently operable light emitting semiconductors.

8. The display module of claim 1, wherein the first package-polarizer set has a height h between a bottom of the polarizer and a bottom of a first one of the light emitters, there a distance d between the first and second package-polarizer sets such that $0.3h \leq d \leq 0.7h$, inclusive.

9. The display module of claim 1, wherein the first package-polarizer set has a height h between a bottom of the polarizer and a bottom of a first one of the light emitters, there a distance d between the first and second package-polarizer sets such that $0.4h \leq d \leq 0.6h$, inclusive.

10. The display module of claim 1, wherein each of the first and second package-polarizer sets comprises a 1 mm×1 mm Glass-On-Board (GOB) or Chip-On-Board (COB), and the first and second package-polarizer sets are distanced by between 0.15 mm and 0.25 mm, inclusive.

11. The display module of claim 1, wherein each of the first and second package-polarizer sets comprises a 1 mm×1 mm Glass-On-Board (GOB) or Chip-On-Board (COB), the first and second package-polarizer sets are distanced by between 0.18 mm and 0.22 mm, inclusive.

12. The display module of claim 1, wherein the blocked percentage is at least 20%.

13. The display module of claim 1, wherein there is no highly opaque filler between the first and second packages and between the second and third packages.

14. The display module of claim 13, further comprising a resin coating above the first, second and third package-polarizer sets.

15. The display module of claim 1, wherein each of the first, second, and third packages includes a highly opaque side wall.

16. The display module of claim 1, wherein each of the first, second, and third packages comprises a Glass-On-Board (GOB) package or a Chip-On-Board (COB) package.

17. The display module of claim 1, further comprising a low opacity material encapsulating the at least first, second, and third, package-polarizer sets at least above the substrate.

18. A stereoscopic display module, comprising:
a substrate;
at least first, second and third light emitting packages physically coupled to the substrate, wherein the second package is situated between the first and third packages; and
each of the first, second, and third packages includes one or more light emitter(s) collectively configured to emit at least three different visible colors of light;
wherein the first, second, and third polarizers are disposed above light emitters of the first, second and third packages to form first, second, and third, package-polarizer sets, respectively; and
wherein the first package-polarizer set has a height h between a bottom of the polarizer and a bottom of a first one of the light emitters, and there a distance d between the first and second package-polarizer sets such that $0.3h \leq d \leq 0.7h$, inclusive.

19. The display module of claim 18, wherein $0.4h \leq d \leq 0.6h$, inclusive.

20. The display module of claim 18, wherein each of the first and second package-polarizer sets comprises a 1 mm×1 mm Glass-On-Board (GOB) or Chip-On-Board (COB), and the first and second package-polarizer sets are distanced by between 0.15 mm and 0.25 mm, inclusive.

21. The display module of claim 18, wherein each of the first and second package-polarizer sets comprises a 1 mm×1 mm Glass-On-Board (GOB) or Chip-On-Board (COB), the first and second package-polarizer sets are distanced by between 0.18 mm and 0.22 mm, inclusive.

22. The display module of claim 18, wherein there is no highly opaque filler between the first and second packages and between the second and third packages.

23. The display module of claim 18, further comprising a low opacity material encapsulating the at least first, second, and third, package-polarizer sets at least above the substrate.

* * * * *